(12) United States Patent
Edmark

(10) Patent No.: US 6,236,402 B1  
(45) Date of Patent: May 22, 2001

(54) DISPLAY TECHNIQUES FOR THREE-DIMENSIONAL VIRTUAL REALITY

(75) Inventor: John T. Edmark, New York City, NY (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/160,758

(22) Filed: Sep. 25, 1998

Related U.S. Application Data

(63) Continuation-in-part of application No. 09/107,059, filed on Jun. 30, 1998.

(51) Int. Cl.$^7$ .................................................. G06T 17/00
(52) U.S. Cl. ........................................... 345/419; 345/427
(58) Field of Search ............................... 345/418, 419, 345/420, 427, 433, 139, 473, 474

(56) References Cited

U.S. PATENT DOCUMENTS 5,124,693 * 6/1992 Himelstein et al. ................... 345/419  
5,261,041 * 11/1993 Susman ................................. 345/419

OTHER PUBLICATIONS

Youichi Horry et al., "Tour Into The Picture: Using A Spidery Mesh Interface To Make Animation From A Single Image," Computer Graphics Proceedings, Annual Conference Series, 1997, pp. 225–232.

* cited by examiner

Primary Examiner—Cliff N. Vo  
(74) Attorney, Agent, or Firm—J. De La Rosa

(57) ABSTRACT

A limitation of using two-dimensional images, such as videos or photographs, to represent portions of a three-dimensional world occurs when the user moves within the world and views the world from a location different than from the original context of the two-dimensional image, i.e., from a location different than the image's ideal viewing point (IVP). View changes result in the image not aligning well with the surrounding objects of the three-dimensional world. This limitation is overcome by distorting the two-dimensional image so as to adjust the image's vanishing point(s) in accordance with the movement of the user using a pyramidic panel structure. In this manner, as the user moves away from the ideal viewing point, the distortions act to limit the discontinuities between the two-dimensional image and its surroundings. To minimize the depth profile of the pyramidic panel structure, the structure may be segmented into sections and each section translated towards, or away from, the user's viewpoint.

32 Claims, 12 Drawing Sheets

DISPLAY TECHNIQUES FOR THREE-DIMENSIONAL VIRTUAL REALITY

CROSS-REFERENCE TO RELATED APPLICATION

This application is a continuation-in-part of U.S. patent application Ser. No. 09/107,059 filed on Jun. 30, 1998 (Case Edmark-2). The above-identified co-pending application, which is commonly assigned, is incorporated herein by reference.

TECHNICAL FIELD

This invention relates to the integration of three-dimensional computer graphics and a two-dimensional image to provide a realistic three-dimensional virtual reality experience.

BACKGROUND OF THE INVENTION

The display of a three-dimensional virtual reality world to a user requires considerable computation power, and it is typically costly to develop the necessary highly detailed models required for doing so. In order to simplify the problem, two-dimensional images, such as videos or photographs, may be used to represent or simulate portions of the three-dimensional world. A great reduction in computation power and cost can be achieved by such an arrangement.

SUMMARY OF THE INVENTION

A limitation of such a world occurs when a user moves within the world and views the world from a location different than the original context of a two-dimensional image which has been carefully calibrated to "fit into" the world. View changes, such as from a location different than the image's ideal viewing point, result in the image not aligning or fitting well with the surrounding objects of the three-dimensional world. We have recognized that, in accordance with the principles of the invention, viewpoint changes may be dealt with by distorting the two-dimensional image so as to adjust the image's vanishing point(s) in accordance with the movement of the user using a novel "pyramidic panel structure." In this manner, as the user moves away from the ideal viewing point, the distortions act to limit the discontinuities between the two-dimensional image and the surroundings of the world. In certain embodiments, the pyramidic panel structure may be segmented into sections, each translated towards or away from the user's viewpoint and then scaled, so as to minimize the depth profile of the pyramidic panel structure.

DETAILED DESCRIPTION

Figure 1:
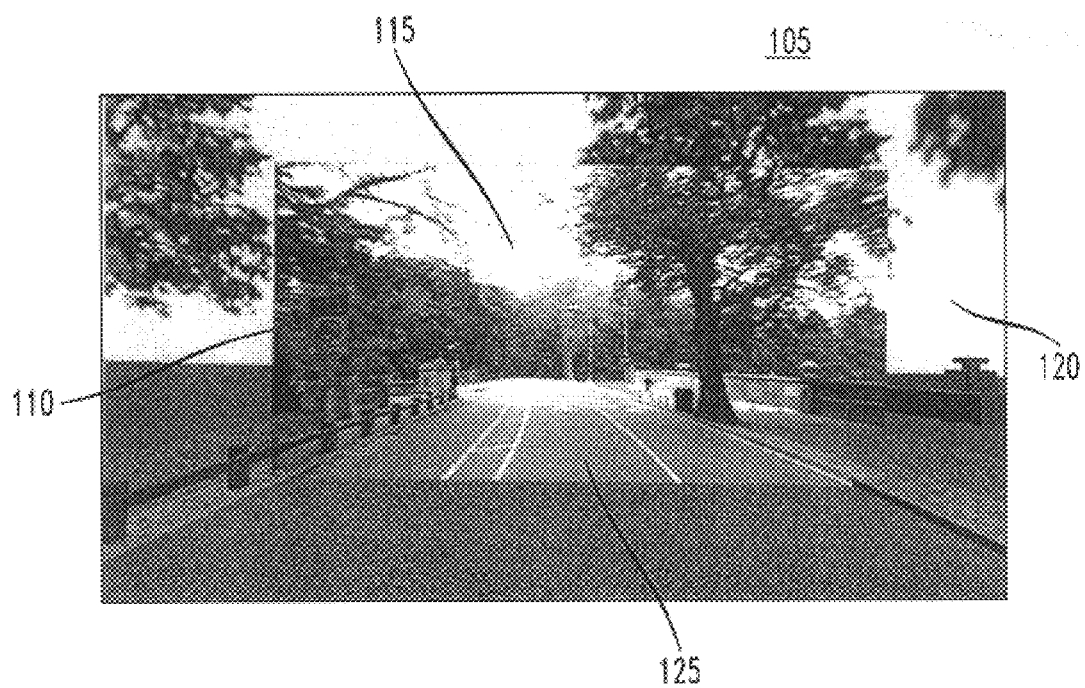
FIG. 1 shows an example of that which a user sees when a user views the world from the ideal viewing point for a two-dimensional image representing a portion of the world.
Figure 2:
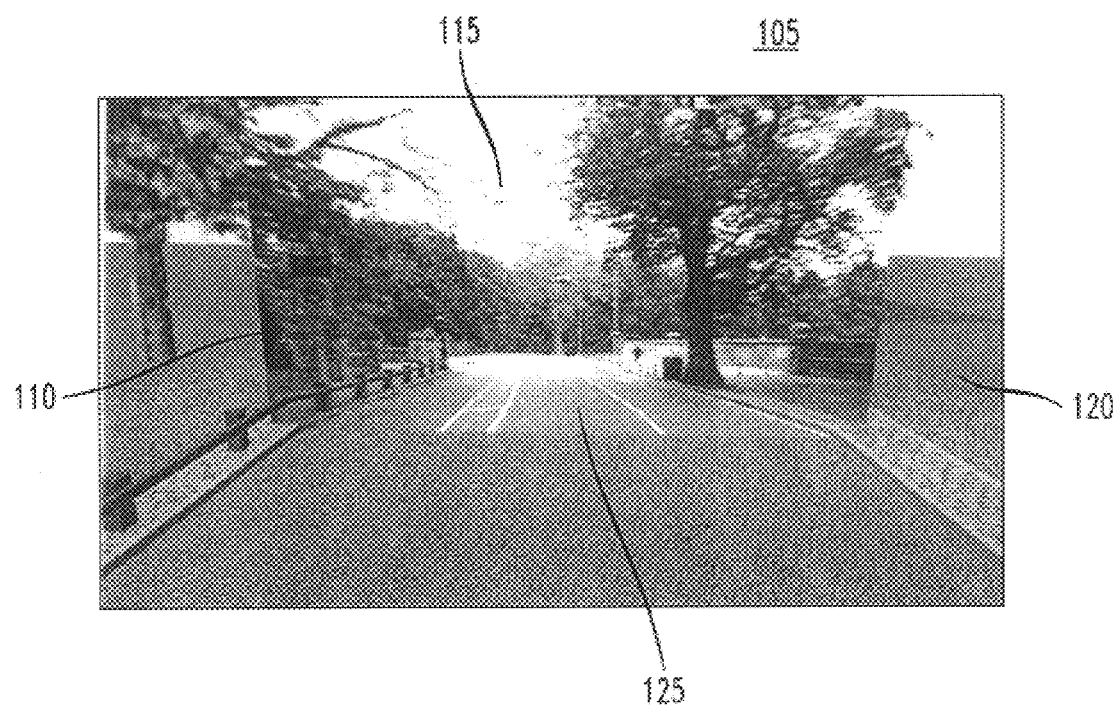
FIG. 2 shows an example of that which a user sees when a user moves within the world of FIG. 1 and views the two-dimensional image from a location different than the image's ideal viewing point, without the use of the present invention.

To better understand the invention, FIGS. 1–2 show examples of that which a user sees when the user moves within a three-dimensional virtual reality world (x,y,z) and views a two-dimensional image (x,y) representing a portion of the world from a location at the image's ideal viewing point (IVP), and then from a different location, i.e., a location different than the original context of the image. It should be understood that the two-dimensional image has been carefully calibrated to "fit into" the surroundings of the world. For simplification of terminology purposes, we shall use the term two-dimensional image to denote either a video clip or a photograph. In accordance with the principles of the invention, as the user moves away from the ideal viewing point, discontinuities between the two-dimensional image and its surroundings are minimized by distorting the image according to the movement of the user.

FIG. 1 shows an exemplary three-dimensional reality world 105, which is a bicycle path in a park, e.g., Central Park in New York City. In representing world 105, the present invention exploits a characteristic common for images consisting of views looking down the center of roads, streets or paths, which is that they may be treated as perspective, corridor-like images, with features closer to the center of the image being farther away from the viewer along the z-axis. Accordingly, the bicycle path or road and its immediate vicinity are treated as a kind of three-dimensional, corridor-like image whose floor is formed by the roadbed, whose ceiling is formed by the sky, and whose sidewalls are formed by the roadside objects. In this manner, the principles of a simple point perspective can be used for distorting the landscape image in accordance with the movement of the viewer, as discussed herein below.

World 105 is divided into two portions, screen or panel 110 on which is shown or displayed a two-dimensional image 115, such as a still photograph, picture, or a current frame of a video clip; and the remainder of the world 120, which is represented using computer graphics techniques, and is thus referred to herein as computer graphics (CG Part) 120. Within CG Part 120 there are various synthetic, three-dimensional landscapes or objects modeled in, for example, the Virtual Reality Modeling Language (VRML). Two-dimensional image 115 simulates landscape or terrain portions of the world 105, here a virtual road or course 125 for walking, running or pedaling a bicycle.

Note that although three-dimensional world 105 cannot be actually rendered in a two-dimensional plane (x,y), it can be projected to and displayed on a two-dimensional plane so as to appear to have three dimensions (x,y,z). Accordingly, the techniques of the present invention are preferably employed with computers and software, which are sufficiently sophisticated to display images on a two-dimensional plane as having three dimensions. Note also that to make the world look realistic, computer graphics display techniques use the z component of objects to scale accordingly the x and y components as a function of its distance (z-axis) to the user's viewpoint.

Two-dimensional image 115 is carefully placed, cropped and sized to achieve continuity with the surrounding environment of the CG Part 120. Note that the image is clipped so that the left and right edges of the road in CG Part 120 pass through the left and right bottom corners of the road, respectively, in image 115. This clipping ensures that the roadbed maps to the floor of the hypothetical corridor. In so doing, portions at the boundary between two-dimensional image 115 and CG part 120 are co-planar, i.e., at the same distance away along the z-axis from the user's viewpoint. In "fitting" two-dimensional image 115 to CG part 120, however, there exits only one viewpoint from which that image's content properly corresponds to the surrounding environment of CG Part 120. This unique location is called the image's ideal viewing point (IVP). In FIG. 1, two-dimensional image 115 is seen from its ideal viewing point, and from this view, image 115 aligns well with the surrounding objects of CG Part 120.

Users, however, rarely view image 115 only from its idea viewing point. As the user moves within world 105, such as left or right of road 125, as they round curves, or move closer to or farther from the image, they see image 115 from positions other than its ideal viewing point. Absent the use of the present invention, such viewpoint changes would cause objects or features within image 115 to align improperly with the surrounding environment, as further illustrated in FIG. 2.

In accordance with the principles of the invention, however, screen or panel 110 uses a display structure called a "pyramidic panel structure" for displaying two-dimensional image 115 within the surrounding three-dimensional space of the CG Part 105 so as to deal with viewpoint changes. The transformations associated with the pyramidic panel structure dynamically distort two-dimensional image 115 according to viewer's position so as to adjust the image's vanishing point with the viewer's movement. As the viewer moves from the image's ideal viewing point, these distortions act to limit discontinuities between image 115 and the surroundings of CG Part 120.

Figure 3:
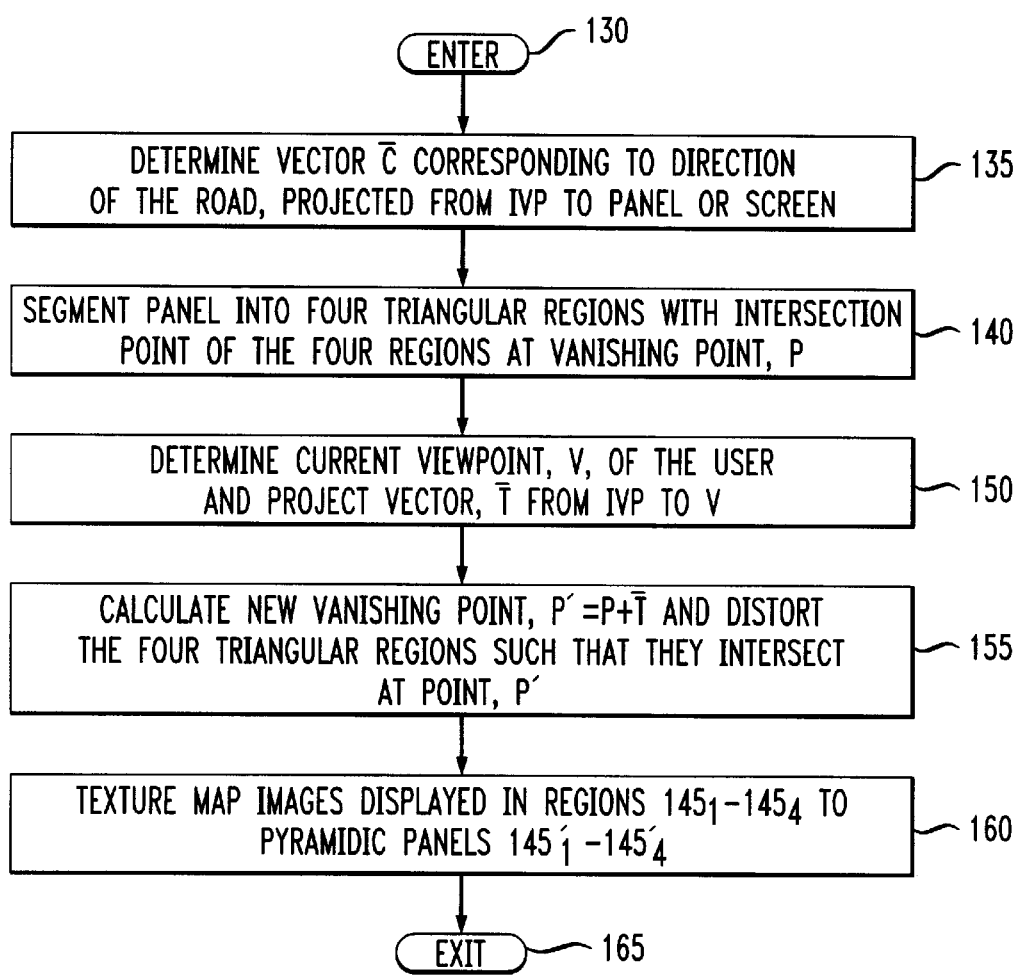
FIG. 3 shows an exemplary process, in accordance with the principles of the invention, for distorting the two-dimensional image using a pyramidic panel structure so as to adjust the image's vanishing point in accordance with the movement of the user.

FIG. 3 shows an exemplary process in accordance with the principles of the invention for distorting two-dimensional image 115 so as to adjust its vanishing point in accordance with the viewer's position. The process is entered at step 130 whenever it is determined that the viewer's position has changed.

Figure 4:
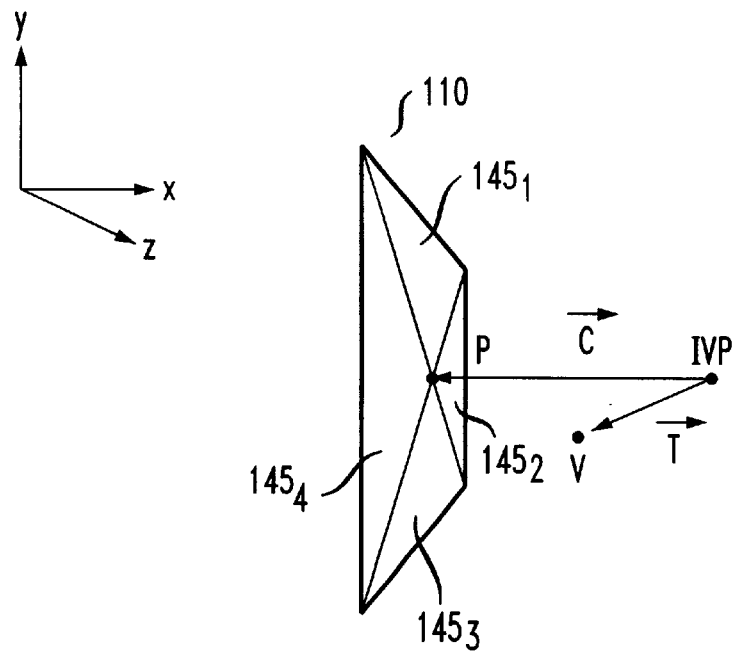
FIGS. 4 and 5 depict the pyramidic panel structure of the present invention for distorting the two-dimensional image so as to adjust the image's vanishing point, in accordance with the movement of the user.

Using the virtual world's road model of the CG Part 105, a vector, $\overline{C}$, corresponding to the direction of road 125 is projected at step 135 from the image's ideal viewing point, IVP, to panel or screen 110 on which is displayed image 115. Note that the panel is two-dimensional, but represents three-dimensional space with objects nearer the center of the image being farther away from the plane of the viewer. The panel structure is shown in FIG. 4. The point of intersection with screen or panel 110 is the image's vanishing point, P. Note, however, that the vanishing point may be set visually by the user, if desired, or by other suitable computer graphics processing techniques known in the art. Next, in step 140, screen or panel 110 is segmented into four triangular regions $145_{1-4}$, one for each of the regions bordering CG Part 120, with the intersection point of the four regions located at the vanishing point, P.

Figure 5:
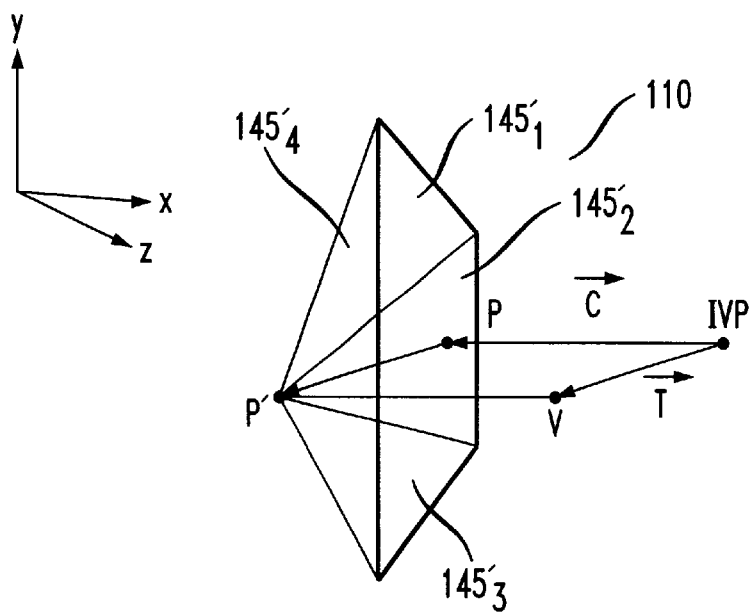

Thereafter in step 150, the current viewpoint of the user, V, is determined, and a vector $\overline{T}$ projected from the ideal viewing point, IVP, to the viewer's current location, V. In accordance with the principles of the invention, as the viewer moves, a new vanishing point P' is calculated as P'=P+$\overline{T}$. The four triangular regions $145_{1-4}$ are distorted in the three-dimensional space of the virtual world at step 155 to represent the mapping of objects nearer the center of the image being displaced farther away from the viewpoint of the user. The four triangular regions intersect at the new vanishing point P' and form so-called "pyramidic panels" $145'_{1-4}$. This is illustrated in FIG. 5. At step 160, the corresponding images displayed in regions $145_{1-4}$ are then "texture-mapped" onto pyramidic panels $145'_{1-4}$, respectively. In this manner, as the viewer moves away from the image's ideal viewing point, IVP, distortions in the image resulting from moving the image's vanishing point from P to P' act to limit the discontinuities between image 115 and the surroundings within CG Part 105.

In the exemplary illustration of FIG. 5, distorting image 115 so as to move the vanishing point from P to P' results in pyramidic panel structure forming a four-sided pyramid. Note that its base is fixed and corresponds to original screen or panel 110, with its peak located at P', which moves in concert with the viewer's current location, V. As the user's viewpoint moves closer to and farther from the image, the image's vanishing point accordingly moves farther from and closer to the user's viewpoint, respectively.

Figure 6A:
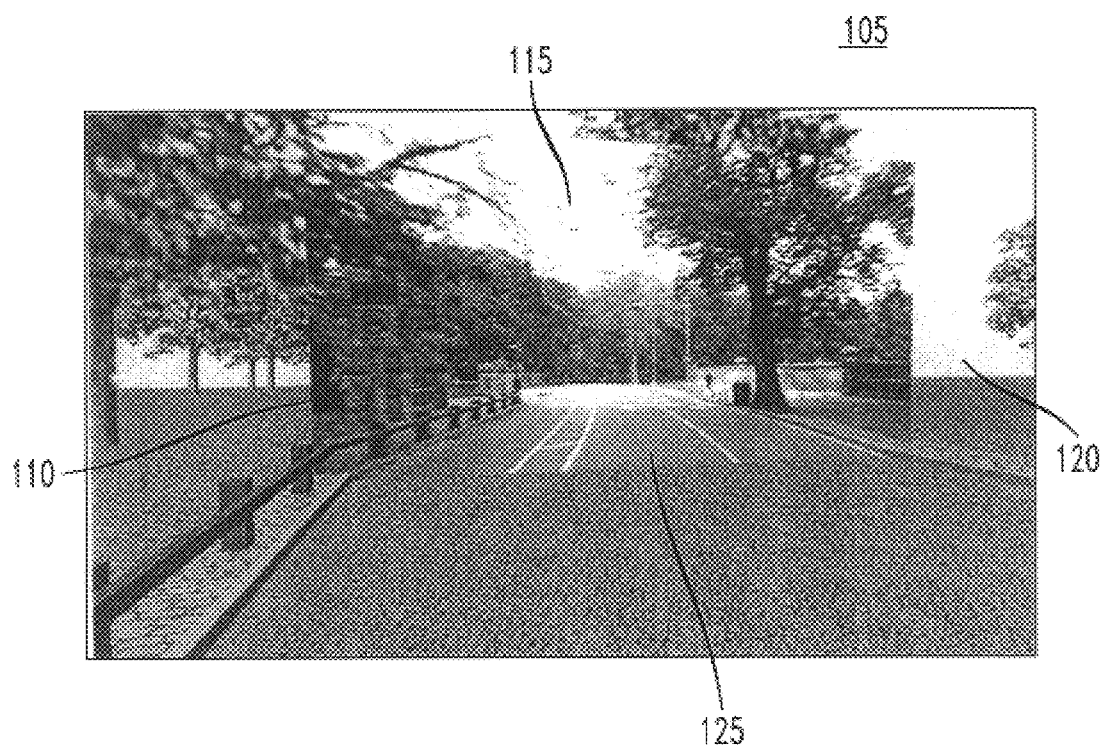
FIGS. 6A–B depict examples of that which a user sees when a user views the world from a location left of the image's ideal viewing point, without and with the use of the present invention, respectively.
Figure 6B:
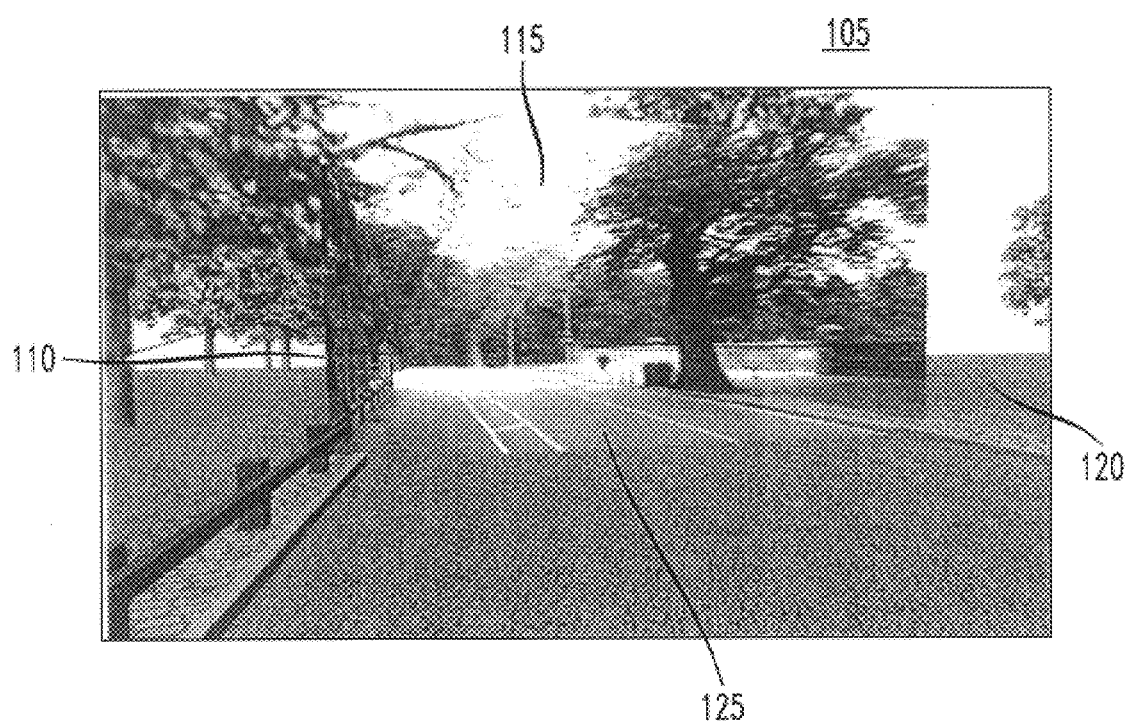
Figure 7A:
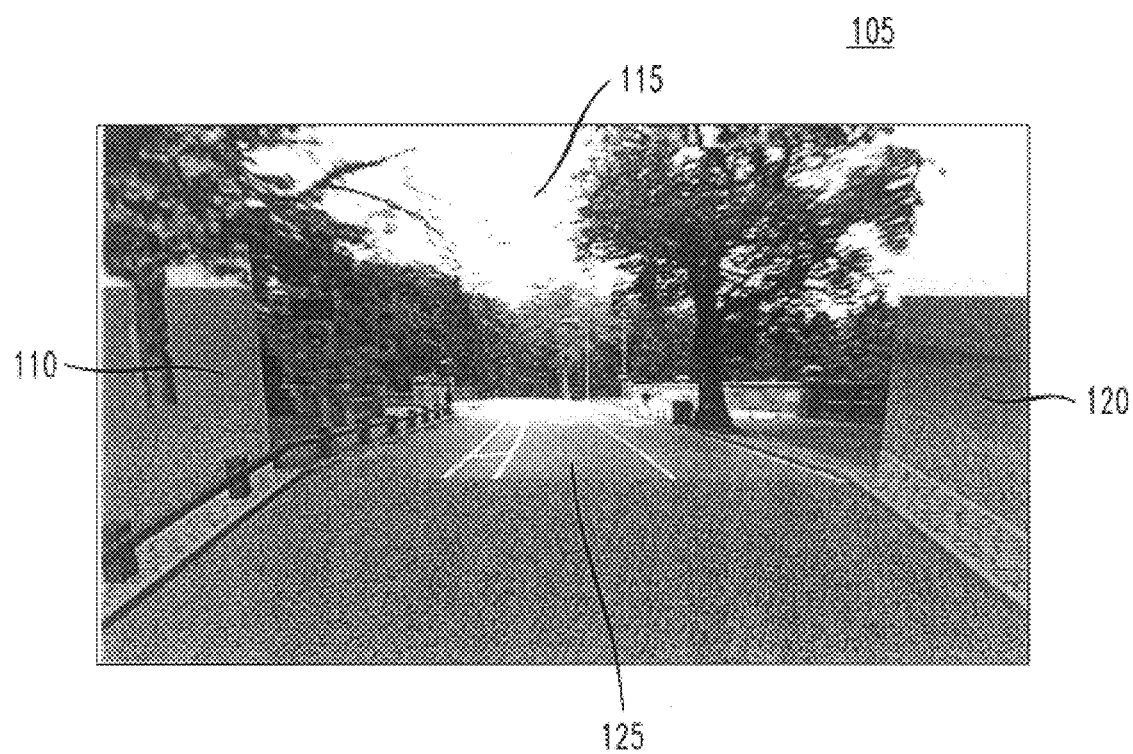
FIGS. 7A–B depict examples of that which a user sees when a user views the world from a location above the image's ideal viewing point, without and with the use of the present invention, respectively.
Figure 7B:
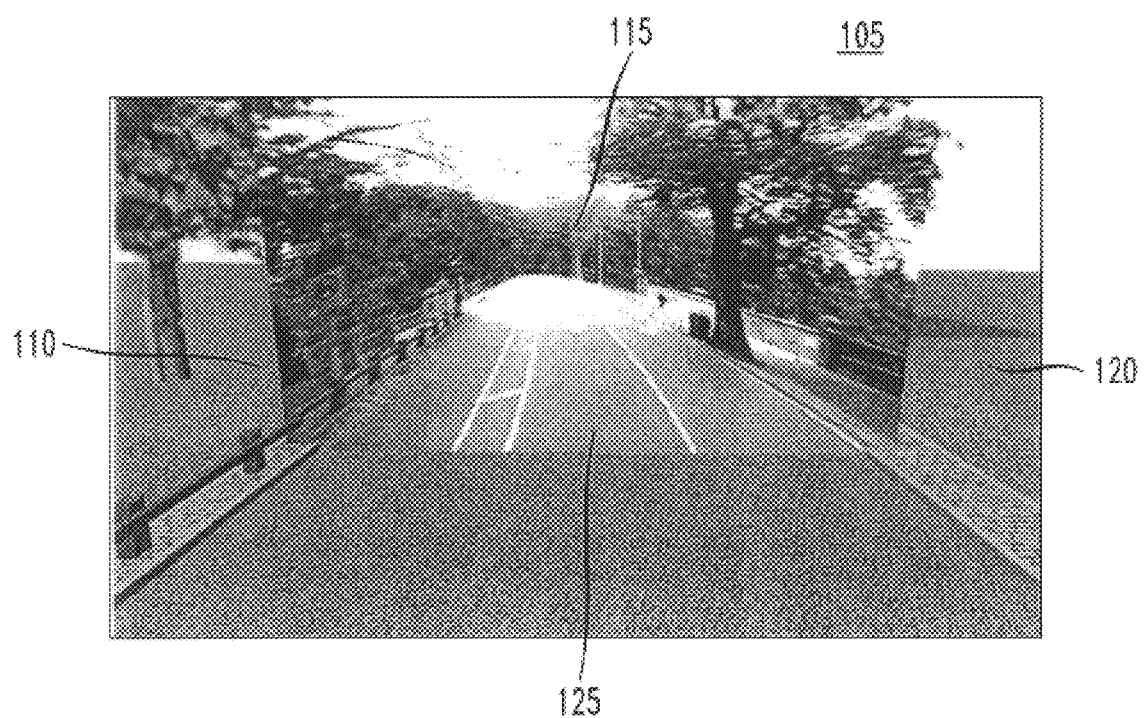
Figure 8A:
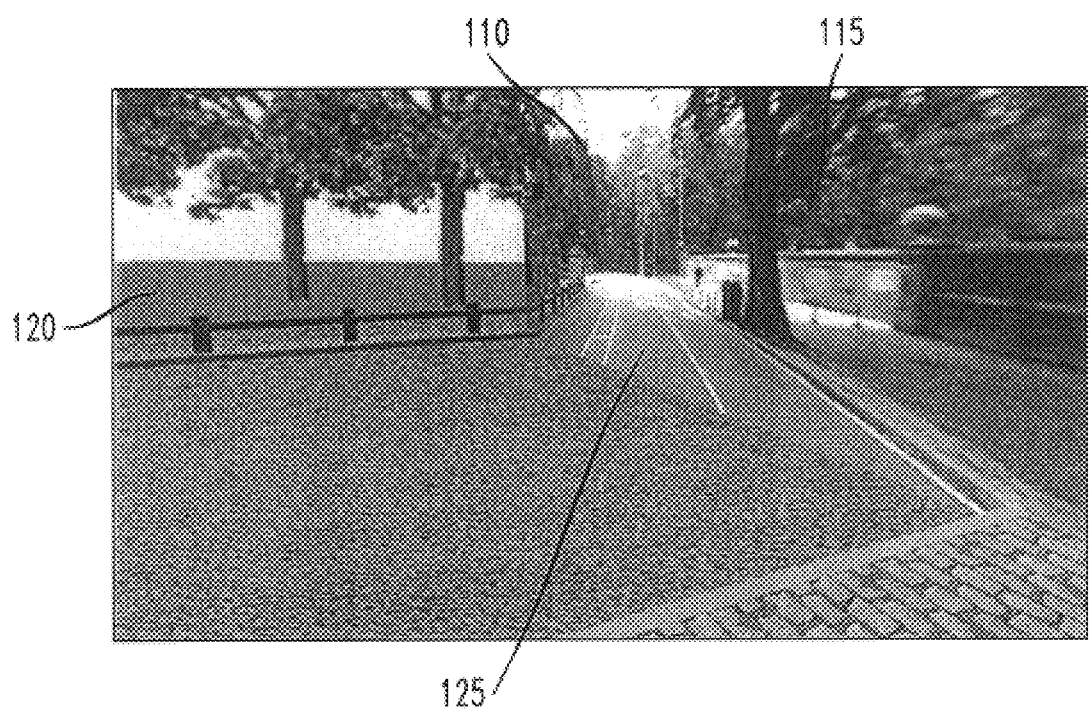
FIGS. 8A–B depict examples of that which a user sees when a user views the world from a location toward the front and the right of the image's ideal viewing point, without and with the use of the present invention, respectively.
Figure 8B:
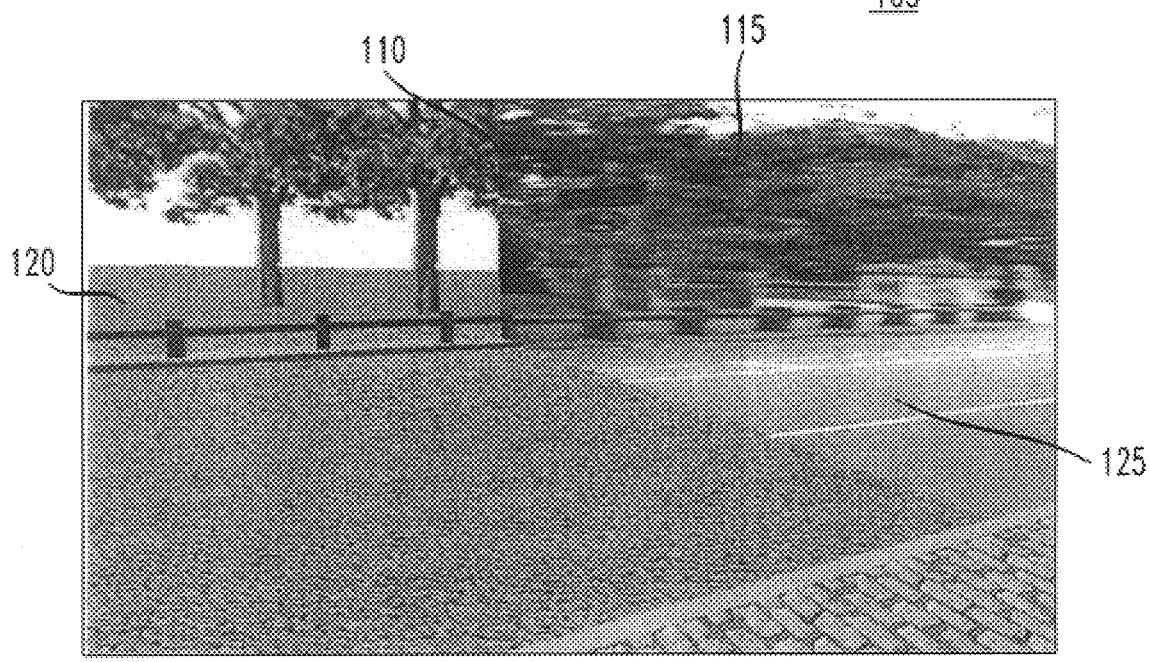

FIGS. 6 through 8 compare the display of two-dimensional image 115 on screen or panel 110 with the display of the same image using the "pyramidic" panels of the present invention. More specifically, FIGS. 6A, 7A and 8A depict viewing two-dimensional image 115 at a location from the left, above, and in front and to the right of the image's ideal viewing point, IVP, respectively, without the use of the present invention. In these latter figures, note that there are discontinuities between the edges of the road and the three-dimensional space of CG Part 105. FIGS. 6B, 7B and 8C depict the same two-dimensional image distorted and texture-mapped onto pyramidic panels $145'_{1-4}$, in accordance with the principles of the invention. Note that in these latter figures, the discontinuities in the road edge have been substantially eliminated.

In another embodiment of the present invention, a modified pyramidic panel structure may be used to deal with two-dimensional images containing curved roads, streets, paths and other corridor-like images containing multiple rather than a single vanishing point. In this latter case, screen or panel 110 is segmented using multiple vanishing points to form a so called "articulated pyramidic panel structure." The transformations associated with the articulated pyramidic panel structure dynamically distort different portions of two-dimensional image 115 according to viewer positions so as to adjust the different vanishing points of the image with the viewer's movement. Likewise, as the viewer moves from the image's ideal viewing point, these distortions act to limit the discontinuities between two-dimensional image 115 and the surroundings of CG Part 120.

Figure 9:
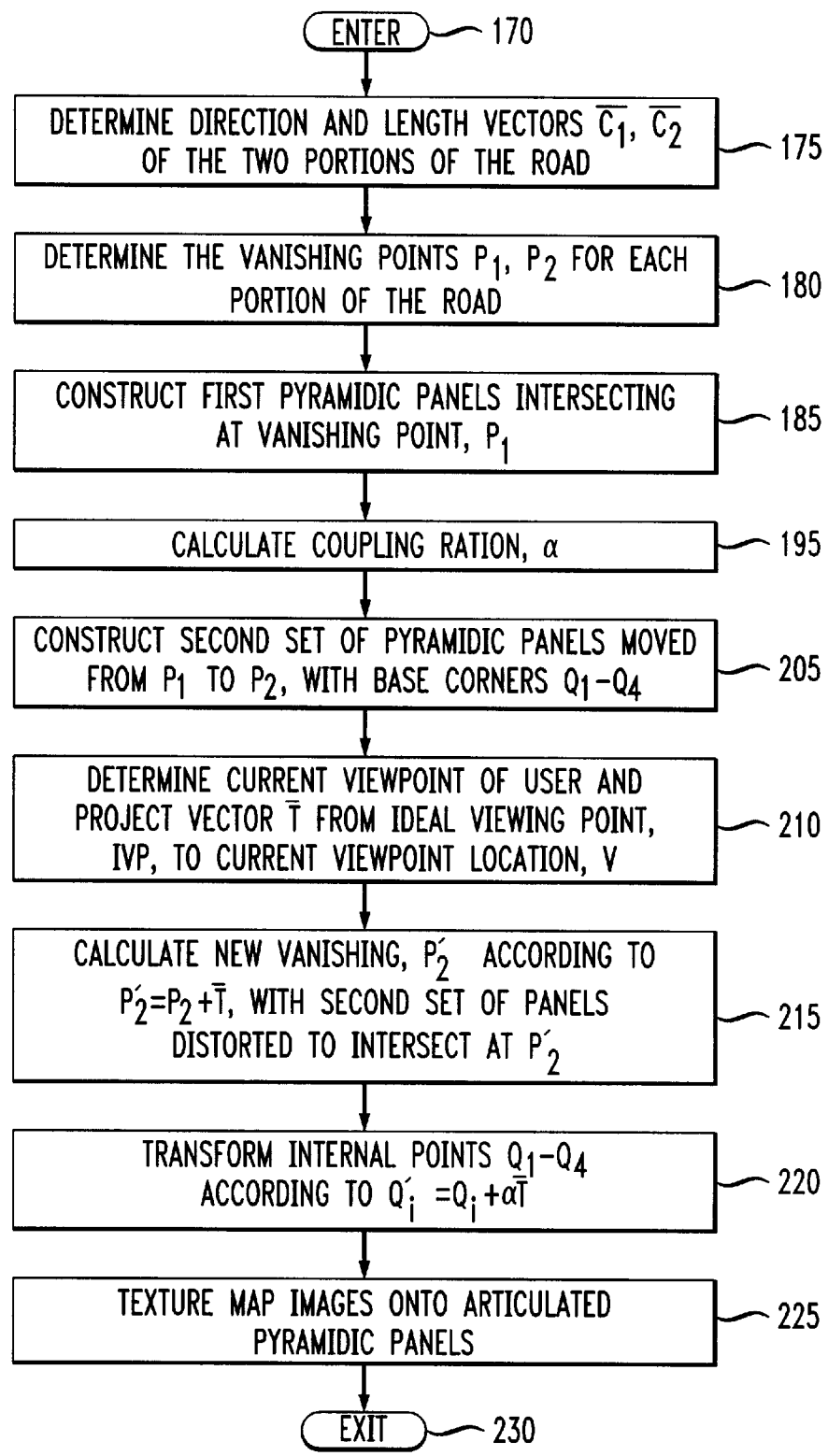
FIG. 9 shows an exemplary process, in accordance with the principles of the invention, for distorting a two-dimensional image using an articulated pyramidic panel structure so as to adjust multiple vanishing points in the image, in accordance with the movement of the user.

FIG. 9 shows an exemplary process in accordance with the principles of the invention for distorting two-dimensional image 115 using an articulated pyramidic panel structure. Again, the process is entered at step 170 whenever it is determined that the viewer's position has changed. In general, curve road 125 is treated as two straight corridors placed end-to-end, extending back from screen or panel 110. Each corridor represents a different portion of road 125 in the three-dimensional space of world 105, with features nearer the center of the image being farther away from the user's viewpoint.

Figure 10:
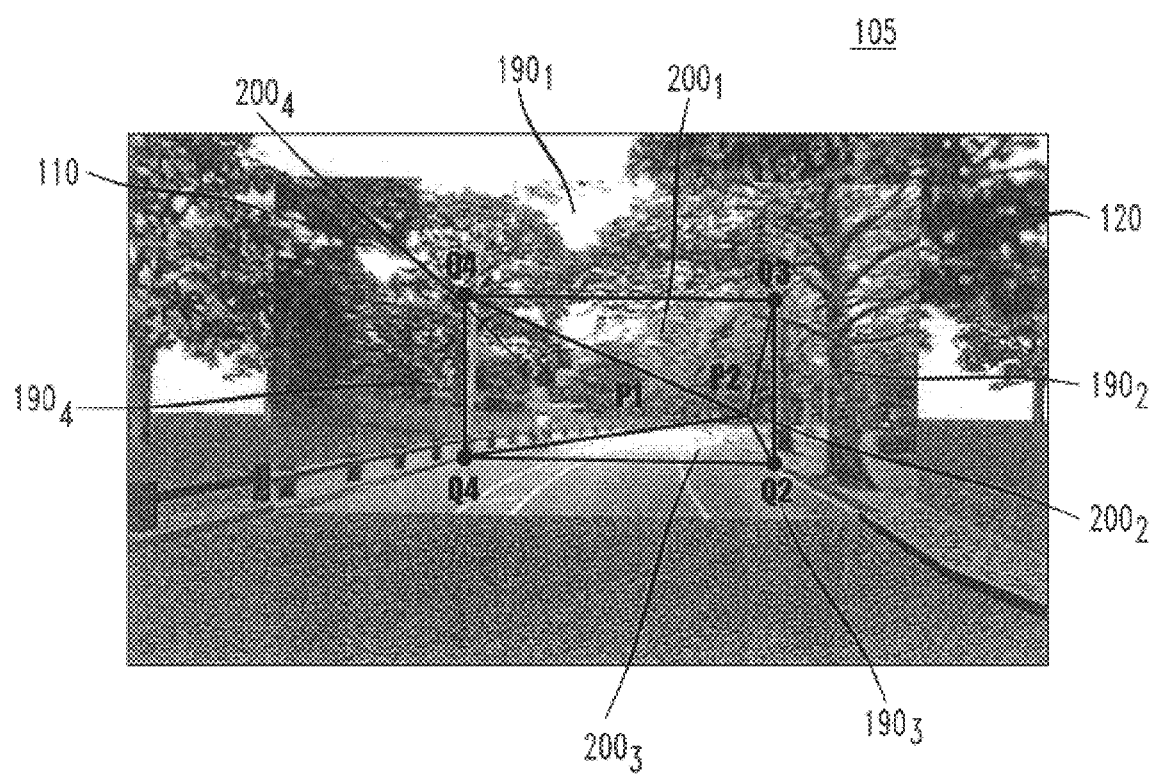
FIG. 10 depicts an example of the articulated pyramidic panel structure of the present invention.

Using the virtual world's road model of the CG Part 105, corresponding directional vectors $C_1$ and $C_2$ of the corridors are determined at step 175. Note that portion of the road nearer to the user's viewpoint is represented by $C_1$, and the portion farther away is represented by $C_2$. Next, in step 180, using the vectors $C_1$ and $C_2$, the corresponding vanishing points $P_1$ and $P_2$ are determined, respectively, for each corridor by projecting those vectors from the image's ideal viewing point, IVP. Alternatively, vanishing points $P_1$ and $P_2$ may be determined visually by the user, or by some other suitable means known in the art. In step 185, using the first corridor's vanishing point, $P_1$, a first set of pyramidic panels $190_{1-4}$ are constructed to intersect at vanishing point, $P_1$, as shown in FIG. 10.

Now at step 195, a coupling ratio $\alpha$ is calculated according to the following equation: $\alpha=l/(l+d)$, where $l$ is the length of the first corridor, and d is the distance between the image's ideal view point (IVP) and the base of pyramidic panels $190_{1-4}$. Each line segment connecting a corner of the base to vanishing point $P_1$ is then divided into two segments by a point placed according to the coupling ratio, $\alpha$. More specifically, the length l' of each line segment from the corner of the base of panels $190_{1-4}$ to this point is given by $l'=\alpha l''$, where l' is the total length of the segment between the corner of the panel and the vanishing point, $P_1$. These four points labeled Q1 through Q4 are connected to form the base of a second set of smaller pyramidic panels $200_{1-4}$ embedded within the larger panels (step 205), as further illustrated in FIG. 10. The intersection point of pyramidic panels $200_{1-4}$ is then moved from $P_1$ to vanishing point, $P_2$.

Figure 11:
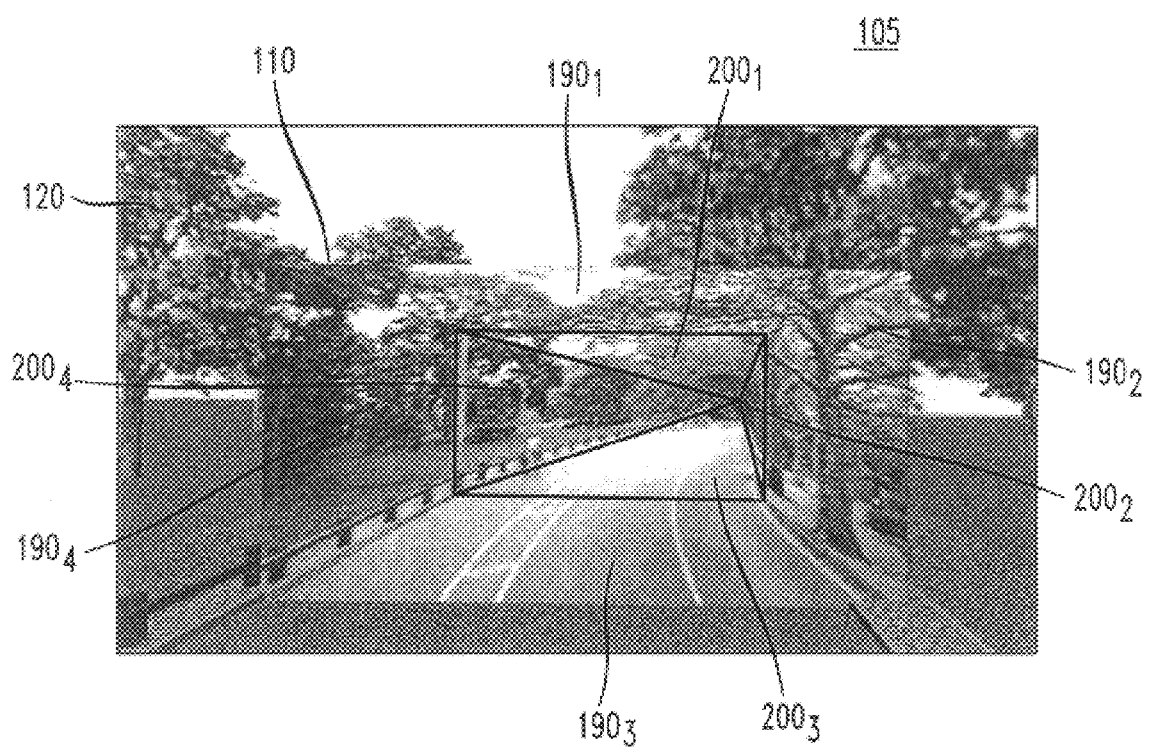
FIG. 11 depicts an example of that which a user sees when a user views the world from a location away from the ideal viewing point of the two-dimensional image, with the use of the articulated pyramidic panel structure of the present invention.

For the articulated pyramidic panel structure, the current viewpoint of the user, V, is determined, and a vector $\overline{T}$ projected from the ideal viewing point, IVP, to the viewer's current location, V (step 210). As the viewer moves, a new vanishing point $P'_2$ is calculated as $P'_2=P_2+\overline{T}$ at step 215, and panels $200_{1-4}$ are then distorted so as to intersect at $P'_2$. As the viewer move, the four internal points Q1 through Q4 are mapped with the viewer's movement to Q1' through Q4', respectively, in accordance with the following relationship: $Q'_i=Q_i+\alpha\overline{T}$, at step 220. Note that doing so, accordingly distorts the first set of pyramidic panels $190_{1-4}$. At step 225, the corresponding images in original panels are then texture-mapped into articulated pyramidic panels $190_{1-4}$ and $200_{1-4}$, which have been distorted in accordance with the movement of the viewer. Note that to unambiguously texture-map onto panels $190_{1-4}$, these panels are each subdivided into two triangular subregions and then texture-mapped. Shown in FIG. 11 is image 115 seen from a location away from the image's ideal viewing point, using the articulated pyramidic panel structure of the present invention.

Note that the above articulated pyramidic panel structure may also use more than two sets of pyramidic panel structures. Instead of treating the curve road as two straight corridors, multiple corridors may be employed, each placed end-to-end and extending back from screen or panel 110. Likewise, each corridor represents a different portion of road 125 in the three-dimensional space of world 105, with features nearer the center of the image being farther away from the user's viewpoint. In such a case, each set of articulated pyramidic panels are formed reiteratively using the above described procedure.

Figure 12:
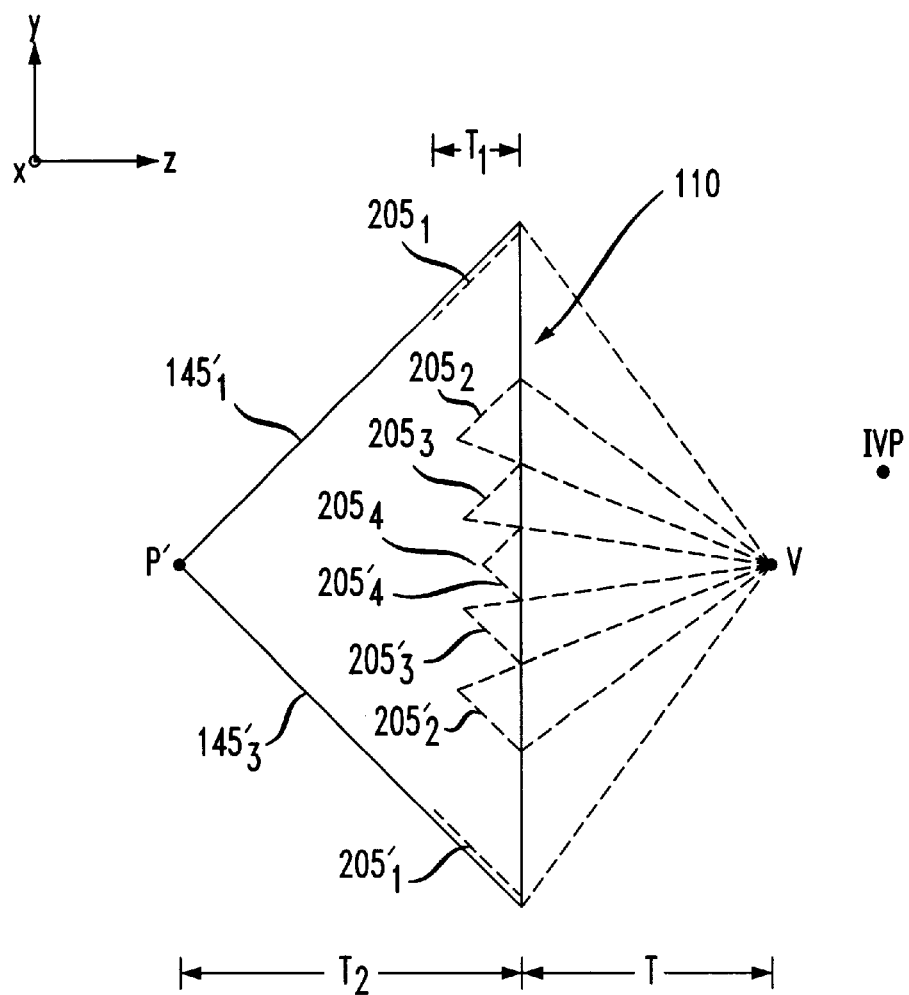
FIGS. 12 and 13 depict side and front views, respectively, of the pyramidic panel structure of FIG. 5 with each panel segmented into a plurality of sections.
Figure 13:
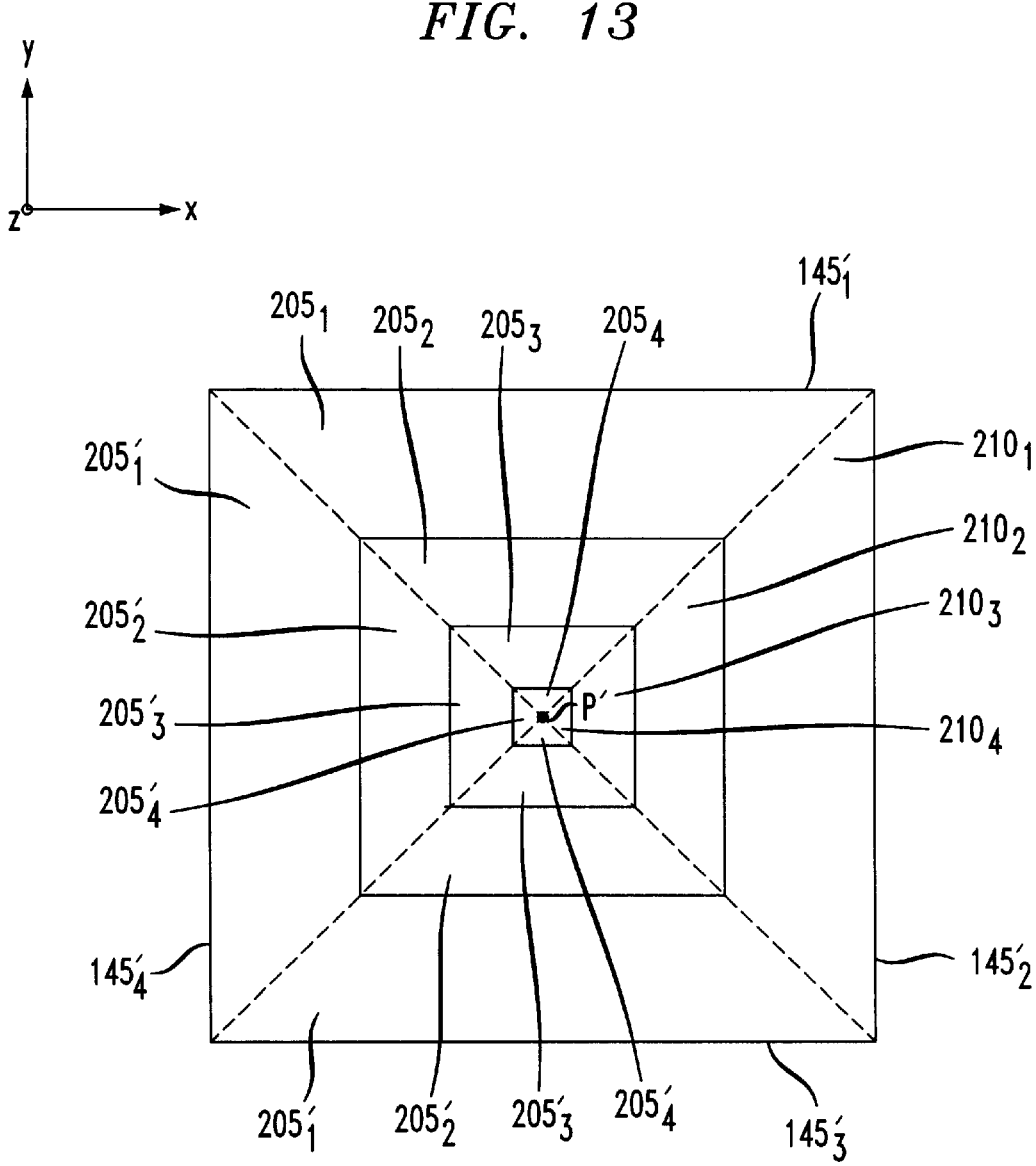

Referring to FIGS. 12–13, there is shown a third embodiment of the present invention which is similar to that of FIG. 5 and in which "pyramidic panels" $145'_1$, $145'_2$, $145'_3$ and $145'_4$ have been now multi-segmented into sections $205_{1-4}$, $210_{1-4}$, $205'_{1-4}$, and $210'_{1-4}$, respectively, with the images in original panels $145_{1-4}$ then texture-mapped into the corresponding translated sections of the pyramidic panel structure, as discussed herein below. It should be recalled that the pyramidic panel structure represents the three-dimensional mapping (x,y,z) of two-dimensional image 115 onto image screen or panel 110 (x,y). Advantageously, the embodiment of FIGS. 12–13 minimizes the depth profile of the pyramidic panel structure along the z-axis. Unlike the embodiment of FIG. 5, the depth profile of this third embodiment does not substantially vary with changes in the user's viewpoint, V. In the exemplary embodiment of FIG. 5, recall that distorting image 115 so as to move the vanishing point from P to P' results in the pyramidic panel structure forming a four-sided pyramid. The base of the pyramid is fixed and corresponds to original screen or panel 110, with its peak located at P' and moves in concert with the viewer's current location, V. As the user's viewpoint moves along the z-axis closer to and farther from two-dimensional image 115, the image's new vanishing point P' moves farther from and closer to the user's viewpoint, respectively. This latter movement causes the depth profile along the z-axis of the pyramidic panel structure to vary accordingly. Unfortunately, this variation in depth profile can undesirably and/or unexpectedly occlude from the user's view objects in the virtual world, or cause objects to occlude other features in the virtual world inasmuch as the corresponding images in the panels are distorted, as discussed above herein.

Figure 14:
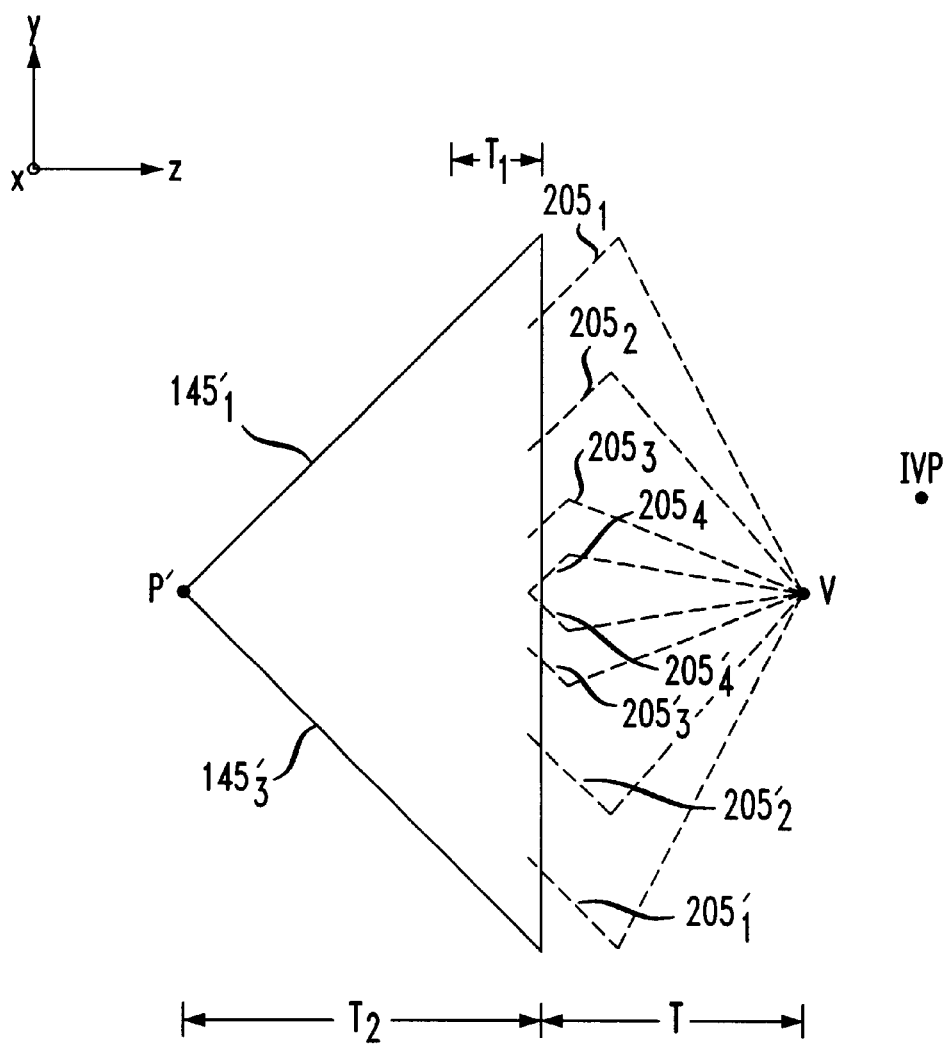
FIG. 14 depicts the pyramidic panel structure of FIG. 5, with each panel segmented into a plurality of sections having its centers located on the surface of a predetermined plane.

To obviate the aforementioned problem, "pyramidic panels" $145'_1$, $145'_2$, $145'_3$ and $145'_4$ have been multi-segmented into sections $205_{1-4}$, $210_{1-4}$, $205'_{1-4}$, and $210'_{1-4}$ respectively. Each section is then translated along the z-axis to a predetermined distance towards or away from the user's viewpoint, V, but importantly of the same orientation as the original section. For example, segmented sections $205_{1-4}$ and $205'_{1-4}$ may each have one of its outer edge along the x-axis translated to lie on the x,y plane of screen or panel 110, as shown in phantom in FIG. 12. As the user moves to a new viewpoint, each section in effect pivots about that edge along the x-axis, which edge lies on the surface of panel 110. Similarly, section 210$_{1-4}$ and 210'$_{1-4}$ may each have one of it outer edge along the y-axis lying on the surface of panel 110. Alternatively, sections 205$_{1-4}$, and 205'$_{1-4}$ may be centered along panel 100, as depicted in FIG. 14. Likewise, sections 210$_{1-4}$ and 210'$_{1-4}$ may be similarly translated, but for the sake of clarity are not shown in FIGS. 12 and 14.

Still further, each of sections 205$_{1-4}$ and 205'$_{1-4}$ may in effect be rotated or pivoted about its other edge along the x-axis as the user moves to a new viewpoint, V, or, in general, about an axis parallel with an edge along the x-axis of the corresponding section. Again, this latter axis may, but does not have to, lie on the surface of panel 110. Regardless of the segmenting method chosen, however, translating each section towards or away from the user's viewpoint significantly reduces the depth profile of the pyramidic panel structure along the z-axis, such as depicted in FIG. 12 from, for example, $T_2$ to $T_1$.

Figure 15:
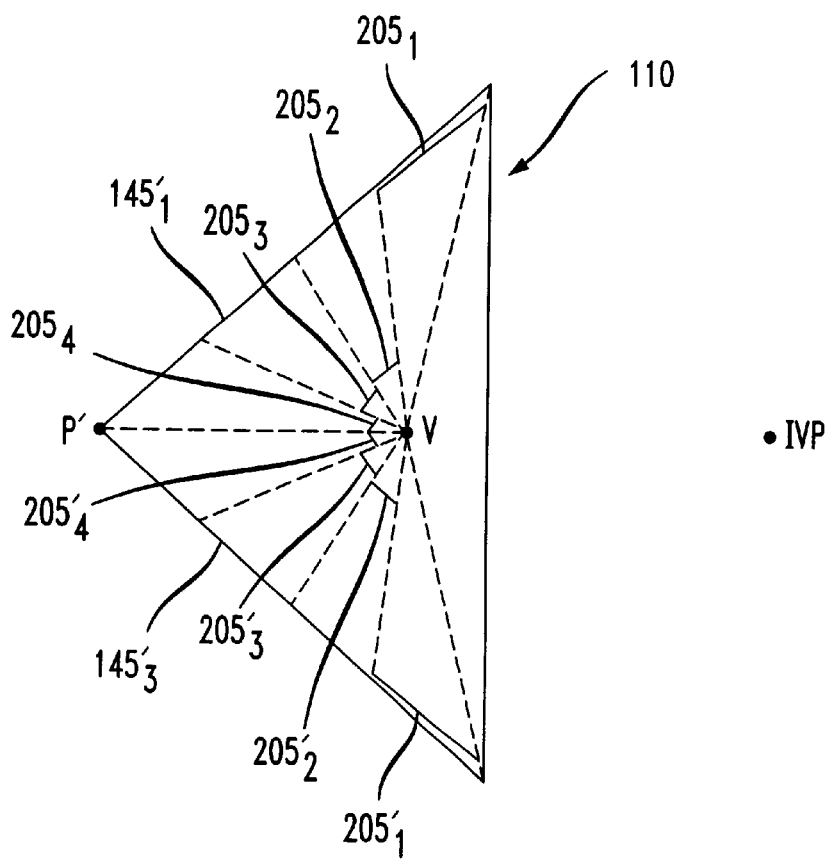
FIG. 15 depicts the pyramidic panel structure of FIG. 5, with each panel segmented into a plurality of sections and each section translated a different distance toward the user's view point, V.

In still another embodiment of the present invention, sections 205$_{1-4}$ and 205'$_{1-4}$ may each be translated a different distance along the z-axis, as illustrated in FIG. 15. Although not shown, sections 210$_{1-4}$ and 210'$_{1-4}$ may likewise be translated. Those skilled in the art will readily understand that doing so advantageously allows the user's viewpoint, V, to extend in front of panel 110 inasmuch as segmented sections corresponding to the image's center may be offset and located closer to the user's viewpoint, V, than the outer sections.

Also, note that segmenting the pyramidic panel structure into a greater number of smaller sections accordingly only further reduces the depth profile, which asymptotically approaches a zero thickness. It is contemplated that the number of sections that the panel structure is divided into may be chosen empirically based on image content as well as the user's range of movement within the virtual world. Preferably, however, the panel structure is dynamically segmented in a reiterative manner. For example, once a user has chosen the maximum desired depth for the panel structure along the z-axis to minimize occlusion, each panel is then reiteratively segmented into a greater number of smaller sections until the depth profile is reduced to the maximum depth profile desired.

In accordance with the principles of the invention, it should be clearly understood, however, that to maintain the apparent integrity of two-dimensional image 115 when texture-mapping the image onto the segmented sections, each segmented sections 205$_{1-4}$, 205'$_{1-4}$, 210$_{1-4}$, and 210'$_{1-4}$ is scaled accordingly with respect to the user's current viewpoint, V, so as to appear to be of the same size as the original corresponding section. This scaling or transform is given by:

$$S_t = S_p \frac{T_t}{T_p}$$

where $S_p$ is the size of the original pyramidic section; $S_t$ is the size of the translated, segmented pyramidic panel section; $T_p$ is distance to the original pyramidic section from the user's viewpoint, V; and $T_t$ is the distance to the translated, segmented pyramidic section. In other words, each segmented, translated section is scaled by the ratio $T_t/T_p$. Of course, as the user moves within the world, pyramidic panels 145'$_{1-4}$ are accordingly re-segmented, translated, and then scaled with respect to the user's new viewpoint, V. Then, the images in original panels 145$_{1-4}$ are again accordingly texture-mapped into the corresponding translated sections 205$_{1-4}$, 205'$_{1-4}$, 210$_{1-4}$, and 210'$_{1-4}$ of the pyramidic panel structure.

The foregoing merely illustrates the principles of the invention. It will thus be appreciated that those skilled in the art will be able to devise various arrangement which, although not explicitly describe or shown herein, embody the principles of the invention and are included within its spirit and scope.

What is claimed is:

1. A method for use in processing a view of a three-dimensional world in which a first portion of said world is modeled as computer graphics and a second portion of said world is represented by a two-dimensional image texture-mapped on a panel, comprising the steps of:

determining the current viewpoint of the user, V;

dividing the panel into triangular regions;

distorting the triangular regions to form pyramidic panels such that a corresponding vanishing point, P, of a portion of the two-dimensional image moves as a function of the current viewpoint of the user;

segmenting each of said pyramidic panels into a plurality of sections;

translating each of said plurality of sections of said pyramidic panels towards, or away from, said current viewpoint of the user, V;

texture-mapping the two-dimensional image onto the plurality of sections of the pyramidic panels; and as the user moves within the three-dimensional world, repeating the above steps so as to limit discontinuities between the two-dimensional image and the computer graphics.

2. The invention as defined in claim 1 wherein said segmenting step includes resegmenting said pyramidic panels into a greater number of smaller sections until the depth profile of the pyramidic panel structure formed from said panels reaches a predetermined level.

3. The invention as defined in claim 1 wherein an outer edge of each of said plurality of sections of said pyramidic panels is located on the surface of a predetermined plane.

4. The invention as defined in claim 3 wherein said predetermined plane is the panel onto which the two-dimensional image texture-mapped.

5. The invention as defined in claim 1 wherein the center of each of said plurality of sections of said pyramidic panels is substantially located at the surface of a predetermined plane.

6. The invention as defined in claims 5 wherein said predetermined plane is the panel onto which the two-dimensional image is texture-mapped.

7. The invention as defined in claim 1 further comprising scaling each of said plurality of sections of said pyramidic panels in accordance with the following relationship $$S_t = S_p \frac{T_t}{T_p},$$

where $S_p$ is the size of the section; $S_t$ is the size of the translated section; $T_p$ is distance the section from the user's viewpoint, V; and $T_t$ is the distance to the translated section from the user's viewpoint, V.

8. The invention as defined in claim 1 further comprising determining a vector, $\overline{C}$, corresponding to the direction of a portion of a path contained within the two-dimensional perspective image, and projecting toward the panel the vector, $\overline{C}$, from the image's ideal viewing point, IVP, the intersection of said vector, $\overline{C}$, with the panel being denoted as the image's vanishing point, P.

9. The invention as defined in claim 1 wherein said distorting of the triangular regions in said distorting step includes determining a new vanishing point, P', for said two-dimensional image in accordance with the following relationship P'=P+$\overline{T}$, wherein $\overline{T}$ is a vector from the image's ideal viewing point, IVP, to the current viewpoint, V.

10. The invention as defined in claim 1 further comprising the step of calibrating the two-dimensional perspective image as a function of the dimensions of the surroundings within the world.

11. The invention as defined in claim 1 wherein said two-dimensional perspective image is a frame of a video.

12. The invention as defined in claim 1 wherein said two-dimensional perspective image is a still picture.

13. A method for use in processing a view of a three-dimensional world in which a first portion of said world is modeled as computer graphics and a second portion of said world is represented by a two-dimensional image texture-mapped on a panel, said two-dimensional image including an object depicted in perspective, said image being such that features of the object closer to a predetermined point of the image are farther away from a user's viewpoint, comprising the steps of:

determining a vector, $\overline{C}$, corresponding to the direction of said perspective object in the three-dimensional world;

projecting towards said panel the vector, $\overline{C}$, from the two-dimensional image's ideal viewing point, IVP, the intersection of said vector, $\overline{C}$, with the panel being denoted as the image's vanishing point, P;

segmenting said panel into triangular regions intersecting at the image's vanishing point, P;

determining the current viewpoint, V, of the user and projecting a vector, $\overline{T}$, from the image's ideal viewing point, IVP, to the current viewpoint, V;

determining a new vanishing point for the two-dimensional image in accordance with the following relationship P'=P+$\overline{T}$;

distorting the triangular regions in the space of the three-dimensional world such that they intersect at the new vanishing point, P';

segmenting each of said triangular regions into a plurality of sections;

translating each of said plurality of sections of said triangular regions towards, or away from, said current viewpoint of the user, V; and texture-mapping the two-dimensional image in the triangular regions onto the corresponding sections of said triangular regions.

14. The invention as defined in claim 13 wherein said segmenting step of said triangular regions includes resegmenting said triangular regions into a greater number of smaller sections until the depth profile of the pyramidic panel structure formed from said triangular regions reaches a predetermined level.

15. The invention as defined in claim 13 wherein said predetermined point is substantially near the center of the two-dimensional image.

16. The invention as defined in claim 13 further comprising displaying the texture-mapped two-dimensional image merged with the first portion of said world that is modeled as computer graphics.

17. The invention as defined in claim 13 further comprising the step of calibrating the two-dimensional image as a function of the dimensions of the surroundings within the world.

18. The invention as defined in claim 13 wherein an outer edge of each of said plurality of sections of said triangular regions is located on the surface of a predetermined plane.

19. The invention as defined in claims 18 wherein said predetermined plane is the panel onto which the two-dimensional image is texture-mapped.

20. The invention as defined in claim 13 wherein the center of each of said plurality of sections of said triangular regions is located on the surface of a predetermined plane.

21. The invention as defined in claim 20 wherein said predetermined plane is the panel onto which the two-dimensional image is texture-mapped.

22. The invention as defined in claim 13 further comprising scaling each of said plurality of sections of said triangular regions in accordance with the following relationship $$S_t = S_p \frac{T_t}{T_p},$$

where $S_p$ is the size of the section; $S_t$ is the size of the translated section; $T_p$ is distance to the section from the user's viewpoint, V; and $T_t$ is the distance to the translated section from the user's viewpoint, V.

23. An apparatus for use in processing a view of a three-dimensional world in which a first portion of said world is modeled as computer graphics and a second portion of said world is represented by a two-dimensional perspective image, said apparatus comprising:

means for determining the current viewpoint of the user, V;

means for dividing the panel into triangular regions;

as the user moves within the three-dimensional world, means for dynamically distorting the triangular regions to form pyramidic panels such that a corresponding vanishing point, P, of a portion of the two-dimensional image moves as a function of the current viewpoint of the user;

means for segmenting each of said pyramidic panels into a plurality of sections;

means for translating each of said plurality of sections of said pyramidic panels towards, or away from, said current viewpoint of the user, V; and means for texture-mapping the two-dimensional image onto the plurality of sections of the pyramidic panels.

24. The invention as defined in claim 23 wherein an outer edge of each of said plurality of sections of said pyramidic panels is located on the surface of a predetermined plane.

25. The invention as defined in claim 24 wherein said predetermined plane is the panel onto which the two-dimensional image is texture-mapped.

26. The invention as defined in claim 23 wherein the center of each of said plurality of sections of said pyramidic panels is located on the surface of a predetermined plane.

27. The invention as defined in claim 23 further comprising means for scaling each of said plurality of sections of said pyramidic panels in accordance with the following relationship $$S_t = S_p \frac{T_t}{T_p},$$

where $S_p$ is the size of the section; $S_t$ is the size of the translated section; $T_p$ is distance to the original section from the user's viewpoint, V; and $T_t$ is the distance to the translated section from the user's viewpoint, V.

28. The invention as defined in claim 23 further comprising means for determining a vector, $\overline{C}$, corresponding to the direction of a portion of a path contained within the two-dimensional perspective image, and means for projecting toward the panel the vector, $\overline{C}$, from the image's ideal viewing point, IVP, the intersection of said vector, $\overline{C}$, with the panel being denoted as the image's vanishing point, P.

29. The invention as defined in claim 23 wherein said means for distorting the triangular regions includes means for determining a new vanishing point, P', for said two-dimensional image in accordance with the following relationship P'=P+$\overline{T}$, wherein $\overline{T}$ is a vector from the image's ideal viewing point, IVP, to the current viewpoint, V.

30. The invention as defined in claim 23 further comprising means for calibrating the two-dimensional perspective image as a function of the dimensions of the surroundings within the world.

31. The invention as defined in claim 23 wherein said two-dimensional perspective image is a frame of a video.

32. The invention as defined in claim 23 wherein said two-dimensional perspective image is a still picture.

* * * * *